US012650620B2

(12) United States Patent
Nikolov et al.

(10) Patent No.: US 12,650,620 B2
(45) Date of Patent: Jun. 9, 2026

(54) HIGH EFFICIENCY ELECTRO-OPTIC MODULATOR

(71) Applicant: THE BOEING COMPANY, Chicago, IL (US)

(72) Inventors: Anguel Nikolov, Culver City, CA (US); Kurt W. Loheit, Rolling Hills Estates, CA (US)

(73) Assignee: THE BOEING COMPANY, Arlington, VA (US)

( * ) Notice: Subject to any disclaimer, the term of this patent is extended or adjusted under 35 U.S.C. 154(b) by 1047 days.

(21) Appl. No.: 17/645,535

(22) Filed: Dec. 22, 2021

(65) Prior Publication Data

US 2022/0390776 A1     Dec. 8, 2022

Related U.S. Application Data

(60) Provisional application No. 63/195,884, filed on Jun. 2, 2021.

(51) Int. Cl.
*G02F 1/03* (2006.01)
*G02F 1/035* (2006.01)

(52) U.S. Cl.
CPC .......... *G02F 1/0316* (2013.01); *G02F 1/0311* (2013.01); *G02F 1/035* (2013.01)

(58) Field of Classification Search
CPC ...... G03F 1/0316; G03F 1/0311; G03F 1/025; G03F 1/061; G03F 1/065; G03F 1/07;
(Continued)

(56) References Cited

U.S. PATENT DOCUMENTS 5,138,480 A     8/1992  Dolfi et al.
6,545,791 B1    4/2003  McCaughan et al.
(Continued)

FOREIGN PATENT DOCUMENTS

CN     211506095 U   *  9/2020
CN     111965857 A   *  11/2020  ............. G02B 6/122
(Continued)

OTHER PUBLICATIONS

Betts, Gary E. et al., "Overview of Optical Modulators and the Properties That Affect Transmission System Performance", Broadband Optical Modulators: Science, Technology, and Applications, Copyright 2012, EBSCO Publishing: eBook Collection (EBSCOhost)—printed on Mar. 23, 2018, pp. 93-152.
(Continued)

*Primary Examiner* — Sharrief I Broome
*Assistant Examiner* — Journey F Sumlar
(74) *Attorney, Agent, or Firm* — Moore IP Law

(57)     ABSTRACT

A method includes receiving light at a light input of an electro-optic modulator device. The method includes directing the light via the light input into optical waveguides in an optical layer of an electro-optic modulator of the electro-optic modulator device. The method includes receiving a signal at an electric input of the electro-optic modulator device. The electric input is associated with an input impedance. The method includes providing the signal to an electrode structure of the electro-optic modulator. The electrode structure generates an electrical field based on the signal. The electric field modulates light in the optical waveguides to produce modulated light based on the signal. The electrode structure includes a constant impedance section associated with a second impedance less than the input impedance. The method also includes providing the modulated
(Continued)

light based on the signal from the optical layer to one or more output optic fibers.

36 Claims, 9 Drawing Sheets

(58) Field of Classification Search
CPC ...... G03F 1/073; G03F 1/0018; G03F 1/0081;
G02F 1/0316; G02F 1/0311; G02F 1/025;
G02F 1/061; G02F 1/065; G02F 1/07;
G02F 1/073; G02F 1/0018; G02F 1/0081
See application file for complete search history.

(56) References Cited

U.S. PATENT DOCUMENTS

| | | | | |
|---|---|---|---|---|
| 6,700,691 | B2 | 3/2004 | Nespola et al. | |
| 6,867,134 | B2 | 3/2005 | Chen et al. | |
| 7,408,693 | B2 | 8/2008 | Kissa et al. | |
| 7,809,218 | B2 | 10/2010 | Iwata et al. | |
| 8,774,566 | B2 * | 7/2014 | Shimizu | G02F 1/0121 |
| | | | | 385/2 |
| 9,664,931 | B1 * | 5/2017 | Yap | G02F 1/225 |
| 9,746,742 | B2 | 8/2017 | Cox et al. | |
| 10,036,904 | B1 * | 7/2018 | Nagarajan | G02F 1/2257 |
| 10,901,245 | B2 | 1/2021 | Nikolov | |
| 2003/0002766 | A1 | 1/2003 | Pruneri et al. | |
| 2004/0002205 | A1 | 1/2004 | Chen et al. | |
| 2005/0013522 | A1 * | 1/2005 | Doi | G02F 1/0121 |
| | | | | 385/3 |
| 2005/0201686 | A1 | 9/2005 | Cole et al. | |
| 2008/0069491 | A1 | 3/2008 | Kissa et al. | |
| 2009/0028204 | A1 | 1/2009 | Hiroyama et al. | |
| 2014/0248019 | A1 * | 9/2014 | Witzens | G02F 1/2255 |
| | | | | 385/2 |
| 2016/0191167 | A1 | 6/2016 | Cox et al. | |
| 2016/0291351 | A1 * | 10/2016 | Kataoka | G02F 1/0356 |
| 2018/0341164 | A1 * | 11/2018 | Williams | G02F 1/2257 |
| 2019/0088943 | A1 | 3/2019 | Kato et al. | |
| 2019/0324345 | A1 * | 10/2019 | Vera Villarroel | G02F 1/2255 |
| 2020/0174290 | A1 | 6/2020 | Nikolov | |
| 2021/0157177 | A1 * | 5/2021 | Kharel | G02F 1/0316 |

FOREIGN PATENT DOCUMENTS

| | | | | |
|---|---|---|---|---|
| WO | WO-2016104551 A1 * | 6/2016 | ............. | G02B 26/02 |
| WO | 2017154631 A1 | 9/2017 | | |

OTHER PUBLICATIONS

Foster, P. J. et al., Optical attenuation in defect-engineered silicon rib waveguides, J. Appl. Phys. 99, 073101 (Year: 2006).

Fuste, Jose Antonio Ibarra, Doctor of Philosophy Dissertation "Design Rules and Optimization of Electro-Optic Modulators Based on Coplanar Waveguides" Universitat Politecnica De Catalunya Barcelonatech, Barcelona, 2013, 146 pages.

Gheorma, I. L. et al, Thin Layer Design of X-Cut LiNbO3 Modulators, IEEE Photonics Technology Letters, vol. 12, No. 12, Dec. 2000, pp. 1618-1620.

Karakuzu, Huseyin et al., Control of the properties of microstructured waveguides in lithium niobate crystal, Optics Express, V. 21, N. 14,2013 (Year: 2013).

Majkic, Aleksej, "Electro-optically tunable microring resonators in fluorine-implanted lithium niobate," Doctoral Thesis, 2009, 94 pgs.

Mercante, Andrew, Design and Fabrication of Broadband Thin-Film Lithium Niobate Phase Modulators, Dissertation, Fall 2018. (Year: 2018).

Muraro, Jr., A. et al., "Design Optimization of Lithium Niobate Modulators Using a Genetic Algorithm," Anais Do V Worcap, INPE, Sao Jose dos Campos, 2005, pp. 1-6.

Noguchi, Kazuto, "Lithium Niobate Modulators", Broadband Optical Modulators: Science, Technology, and Applications, Copyright 2012, EBSCO Publishing: eBook Collection (EBSCOhost)—printed on Apr. 26, 2018, pp. 151-210.

Stenger, V. E., et al. "Low Loss and Low Vpi Thin Film Lithium Niobate on Quartz Electro-optic Moduclators," IEEE, 2017, pp. 1-3.

Stenger, V.E., et al. Wide-Band Electro-Optic Modulator in Thin-Film Lithium Niobate on Quartz Substrate, ECOC Technical Digest, 2012, pp. 1-3.

Stenger, Vincent et al., "Engineered Thin Film Lithium Niobate Substrate for High Gain-Bandwidth Electro-optic Modulators" CLEO 2013 Technical Digest, pp. 1-2.

Levy et al., Chapter 12 Single-Crystal Lithium Niobate Films by Crystal Ion Slicing, 2004 (Year: 2004).

Rabiei et al., Smart guide: lithium niobate large index contrast waveguides fabricated by crystal ion slicing and wafer bonding, Proc.SPIE 5728, Integrated Optics: Devices, Materials, and Technologies IX, (Mar. 31, 2005); doi: 10.1117/12.590100 (Year: 2005).

* cited by examiner

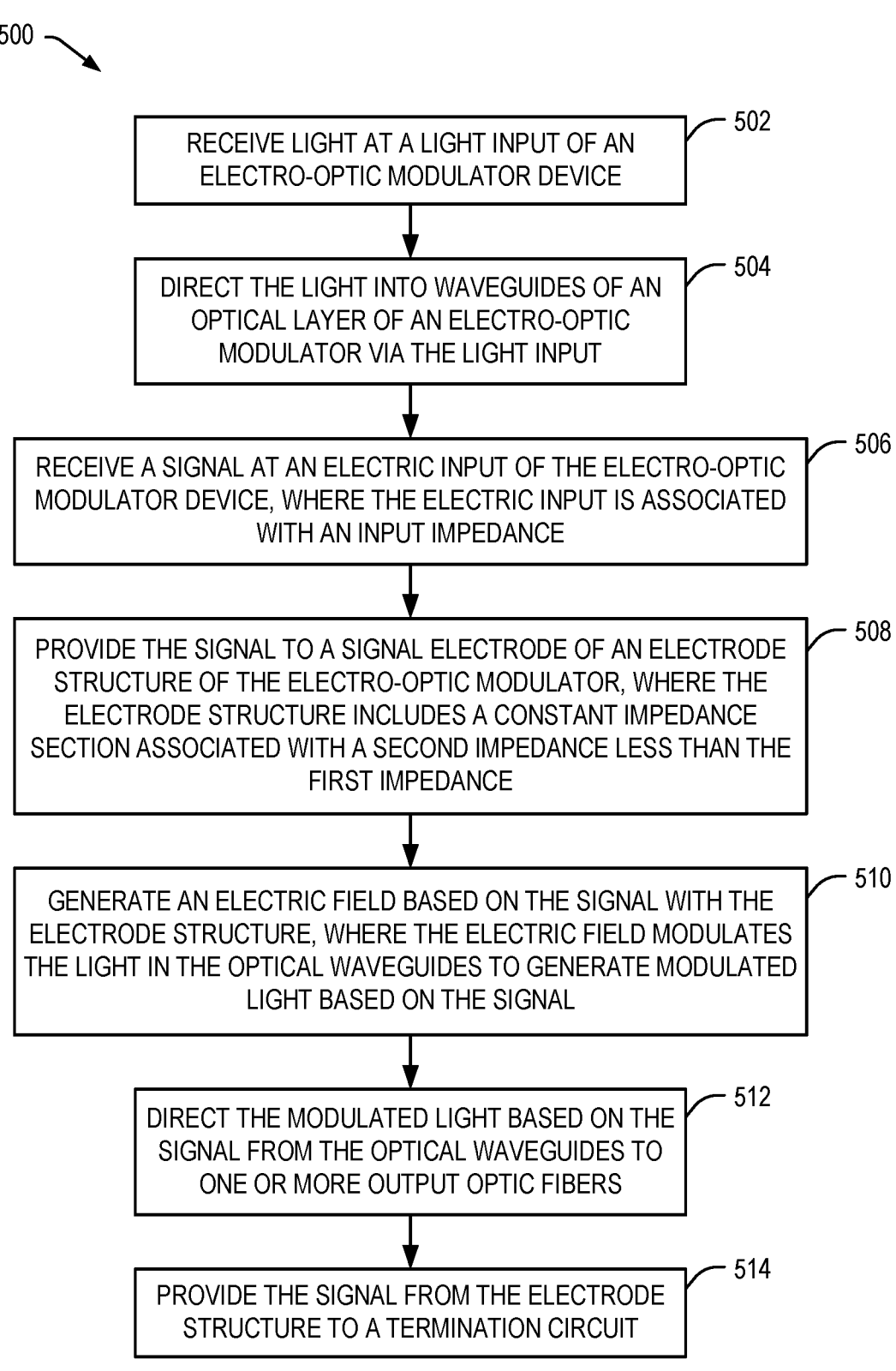

500 ⤹

502 — RECEIVE LIGHT AT A LIGHT INPUT OF AN ELECTRO-OPTIC MODULATOR DEVICE

504 — DIRECT THE LIGHT INTO WAVEGUIDES OF AN OPTICAL LAYER OF AN ELECTRO-OPTIC MODULATOR VIA THE LIGHT INPUT

506 — RECEIVE A SIGNAL AT AN ELECTRIC INPUT OF THE ELECTRO-OPTIC MODULATOR DEVICE, WHERE THE ELECTRIC INPUT IS ASSOCIATED WITH AN INPUT IMPEDANCE

508 — PROVIDE THE SIGNAL TO A SIGNAL ELECTRODE OF AN ELECTRODE STRUCTURE OF THE ELECTRO-OPTIC MODULATOR, WHERE THE ELECTRODE STRUCTURE INCLUDES A CONSTANT IMPEDANCE SECTION ASSOCIATED WITH A SECOND IMPEDANCE LESS THAN THE FIRST IMPEDANCE

510 — GENERATE AN ELECTRIC FIELD BASED ON THE SIGNAL WITH THE ELECTRODE STRUCTURE, WHERE THE ELECTRIC FIELD MODULATES THE LIGHT IN THE OPTICAL WAVEGUIDES TO GENERATE MODULATED LIGHT BASED ON THE SIGNAL

512 — DIRECT THE MODULATED LIGHT BASED ON THE SIGNAL FROM THE OPTICAL WAVEGUIDES TO ONE OR MORE OUTPUT OPTIC FIBERS

514 — PROVIDE THE SIGNAL FROM THE ELECTRODE STRUCTURE TO A TERMINATION CIRCUIT

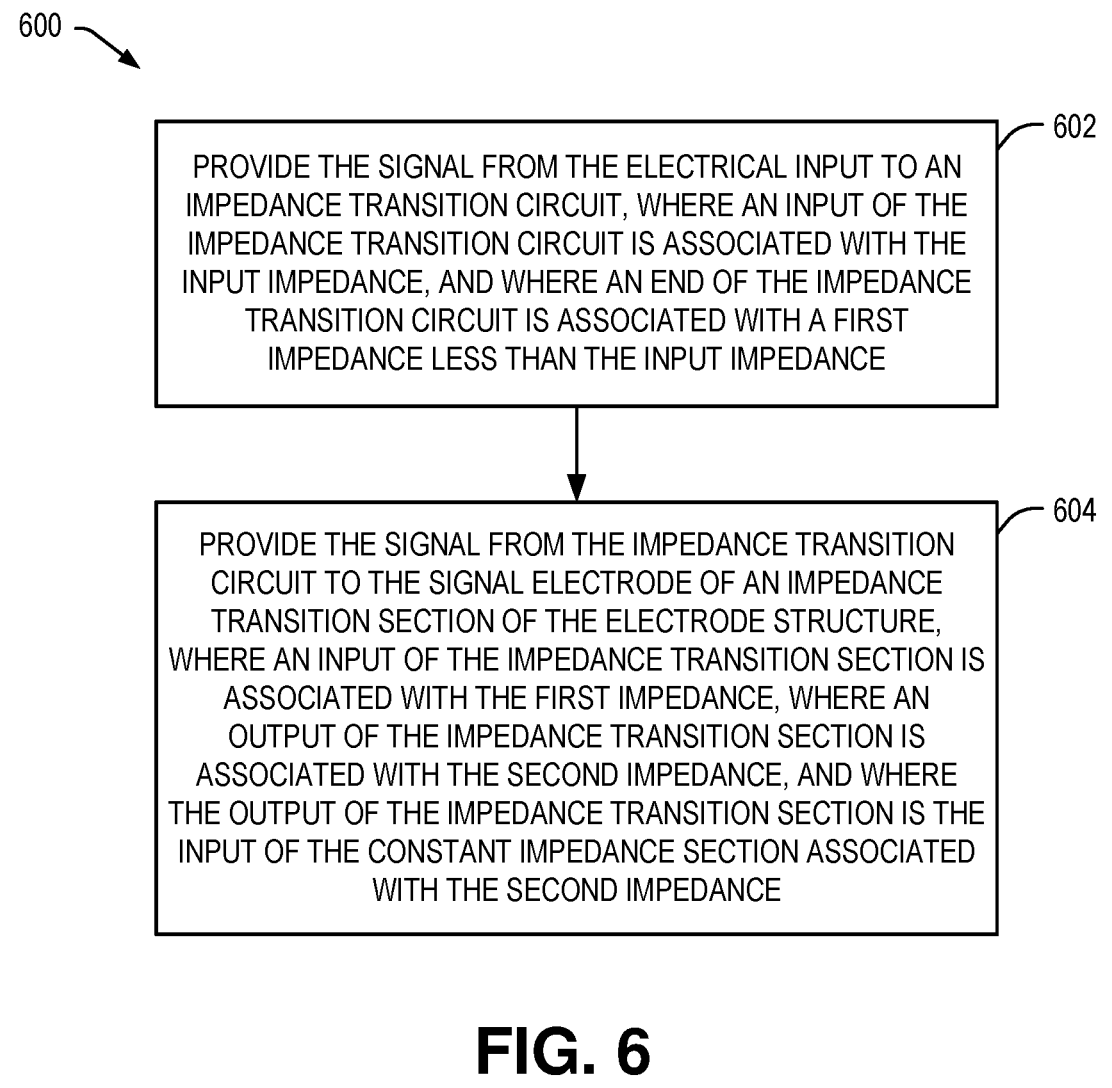

PROVIDE THE SIGNAL FROM THE ELECTRICAL INPUT TO AN IMPEDANCE TRANSITION CIRCUIT, WHERE AN INPUT OF THE IMPEDANCE TRANSITION CIRCUIT IS ASSOCIATED WITH THE INPUT IMPEDANCE, AND WHERE AN END OF THE IMPEDANCE TRANSITION CIRCUIT IS ASSOCIATED WITH A FIRST IMPEDANCE LESS THAN THE INPUT IMPEDANCE

604

PROVIDE THE SIGNAL FROM THE IMPEDANCE TRANSITION CIRCUIT TO THE SIGNAL ELECTRODE OF AN IMPEDANCE TRANSITION SECTION OF THE ELECTRODE STRUCTURE, WHERE AN INPUT OF THE IMPEDANCE TRANSITION SECTION IS ASSOCIATED WITH THE FIRST IMPEDANCE, WHERE AN OUTPUT OF THE IMPEDANCE TRANSITION SECTION IS ASSOCIATED WITH THE SECOND IMPEDANCE, AND WHERE THE OUTPUT OF THE IMPEDANCE TRANSITION SECTION IS THE INPUT OF THE CONSTANT IMPEDANCE SECTION ASSOCIATED WITH THE SECOND IMPEDANCE

FIG. 6

700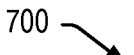

PROVIDE THE SIGNAL FROM THE ELECTRICAL INPUT TO A FIRST IMPEDANCE TRANSITION CIRCUIT OF ONE OR MORE IMPEDANCE TRANSITION CIRCUITS, WHERE AN INPUT OF THE FIRST IMPEDANCE TRANSITION CIRCUIT IS ASSOCIATED WITH THE INPUT IMPEDANCE, WHERE AN OUTPUT OF A LAST IMPEDANCE TRANSITION CIRCUIT OF THE ONE OR MORE IMPEDANCE TRANSITION CIRCUITS IS ASSOCIATED WITH THE SECOND IMPEDANCE, AND WHERE EACH IMPEDANCE TRANSITION CIRCUIT OF THE ONE OR M MORE IMPEDANCE TRANSITION CIRCUITS IS CONFIGURED TO ADIABATICALLY REDUCE A PARTICULAR INPUT IMPEDANCE ASSOCIATED WITH THE IMPEDANCE TRANSITION CIRCUIT TO A PARTICULAR OUTPUT IMPEDANCE ASSOCIATED WITH THE IMPEDANCE TRANSITION CIRCUIT

702

PROVIDE THE SIGNAL FROM THE LAST IMPEDANCE TRANSITION CIRCUIT TO THE SIGNAL ELECTRODE OF THE CONSTANT IMPEDANCE SECTION OF THE ELECTRODE STRUCTURE

Figure 8:
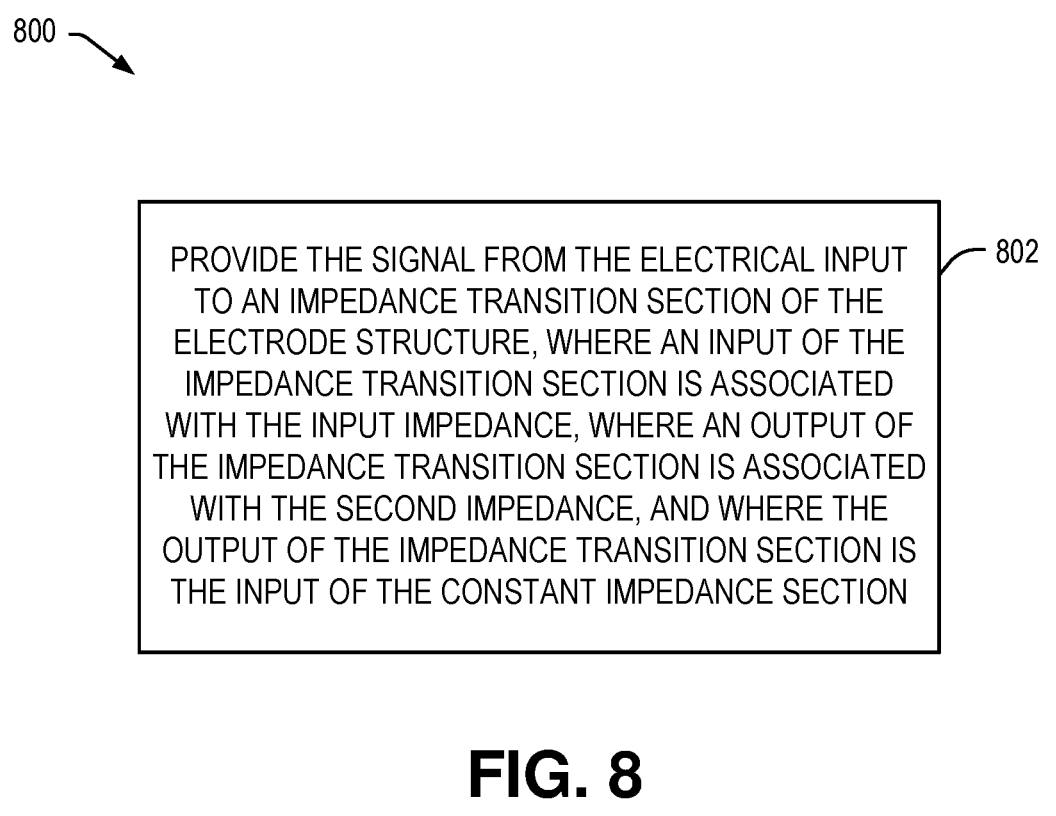

PROVIDE THE SIGNAL FROM THE ELECTRICAL INPUT — 802
TO AN IMPEDANCE TRANSITION SECTION OF THE
ELECTRODE STRUCTURE, WHERE AN INPUT OF THE
IMPEDANCE TRANSITION SECTION IS ASSOCIATED
WITH THE INPUT IMPEDANCE, WHERE AN OUTPUT OF
THE IMPEDANCE TRANSITION SECTION IS ASSOCIATED
WITH THE SECOND IMPEDANCE, AND WHERE THE
OUTPUT OF THE IMPEDANCE TRANSITION SECTION IS
THE INPUT OF THE CONSTANT IMPEDANCE SECTION

COMPUTING DEVICE 902

SYSTEM MEMORY 906

OPERATING SYSTEM 914

APPLICATIONS (E.G., INSTRUCTIONS) 916

PROCESSOR 904

STORAGE DEVICE(S) 908

INPUT/OUTPUT INTERFACE(S) 910

COMMUNICATIONS INTERFACE 912

ELECTRO-OPTICAL MODULATION DEVICE 100

INPUT/OUTPUT DEVICE(S) 918

DEVICE(S) 920

HIGH EFFICIENCY ELECTRO-OPTIC MODULATOR

The present application claims the benefit of U.S. Provisional Patent Application No. 63/195,884 entitled "HIGH EFFICIENCY ELECTRO-OPTIC MODULATOR," filed Jun. 2, 2021, the contents of which are incorporated by reference in their entirety.

REFERENCE TO GOVERNMENT FUNDED CONTRACTS

This invention was made with Government support awarded by The Department of Defense. The Government has certain rights in this invention.

FIELD OF THE DISCLOSURE

The present disclosure is generally related to high efficiency electro-optic modulator devices.

BACKGROUND

Data can be carried via optical fiber. Data is generated, processed, and/or stored in an electrical domain, but when the data needs to be sent via optical fiber, the data is changed to an optical domain by an electro-optic modulator to make optical signals corresponding to the data from electrical signals. Optical signals can be formed by modulating laser light and can be transmitted via optic fibers. High-speed optical data communication links often use electro-optic modulators that operate based on an electro-optical effect in which an optical characteristic is electrically controlled. For example, a modulator based on lithium niobate ($LiNbO_3$) can apply a radio frequency (RF) signal based on data to vary one or more optical properties of light propagating along an optical waveguide of the electro-optic modulator to form modulated light based on the RF signal, which is a conversion of the data from the electrical domain to the optical domain. The modulated light based on the RF signal can be subsequently converted from the optical domain back to the electrical domain to return the data to the electrical domain.

A first aspect of electro-optic modulator efficiency is the ability of the electro-optic modulator to convert electrical signals to optical signals and is characterized by a voltage at an electrical input required to introduce a 180-degree phase shift, which is a half cycle of a given frequency of optical modulation, at one or more optical outputs. The characterizing voltage is referred to as $V\pi$. The lower the $V\pi$ the higher the efficiency of the modulator because less RF power (or electrical energy) is used to create a replica of the electrical signal in the optical domain.

A second aspect of electro-optic modulator efficiency is the modulator transmission loss. Electro-optic modulators receive light from an external light source (e.g., a laser) at optical inputs. The light traverses the electro-optic modulator, is modulated, and exits through output optical port(s). As the light propagates through the electro-optic modulator, dissipation loss occurs, which reduces the optical output. The dissipation loss directly impacts the efficiency of the electro-optic modulator because, for the same optical output, an electro-optic modulator with higher loss will require higher input optical power and overall higher energy usage for a communication link. In addition to the dissipation loss, there are losses due to (1) coupling of light between an input optic fiber that provides light and an optical layer of the electro-optic modulator and (2) coupling of light from the optical layer to one or more output optic fibers. For electro-optic modulators that utilize very thin optical layers that are thinner than diameters of cores of input optic fibers used to provide light to the electro-optic modulators, the coupling losses can be very large, which reduces an efficiency of such electro-optic modulators and requires high energy usage for communication links.

SUMMARY

In a particular implementation, an electro-optic modulator includes an optical layer that includes waveguides. The electro-optic modulator also includes an electrode structure coupled to the optical layer. The electrode structure includes a signal electrode between a pair of ground electrodes. The electrode structure generates an electric field based on a signal carried by the signal electrode. The electric field modulates light in the optical waveguides to produce modulated light based on the signal. The electrode structure includes an impedance transition section that reduces an impedance associated with the electrode structure from a first impedance at an input of the impedance transition section to a second impedance at an end of the impedance transition section. The electrode structure also includes a constant impedance section associated with the second impedance.

In another particular implementation, an electro-optic modulator device includes an electric input to receive a signal. The electric input is associated with an input impedance. The electro-optic modulator device includes an optical layer. The optical layer includes optical waveguides. The electro-optic modulator device also includes an electrode structure coupled to the optical layer. The electrode structure includes a signal electrode between ground electrodes. The signal electrode carries the signal and the electrode structure generates an electric field based on the signal. The electric field modulates light passing through the optical waveguides to produce modulated light based on the signal. The electrode structure includes a constant impedance section associated with a second impedance that is less than the input impedance.

In another particular implementation, an electro-optic modulator device includes a quartz substrate having a first crystal structure. The electro-optic modulator device includes a lithium niobate layer coupled to the quartz substrate. The lithium niobate layer includes a plurality of optical waveguides and the lithium niobate layer has a second crystal structure. The electro-optic modulator device also includes an electrode structure coupled to the lithium niobate layer. The electrode structure includes a signal electrode that carries a signal and ground electrodes. The electrode structure is positioned in working relation to the waveguides in a first section of the lithium niobate layer. The electrode structure generates an electric field based on the signal between the signal electrode and the ground electrode. The electric field passes through the optical waveguides and modulates light in the optical waveguides to produce modulated light based on the signal. The electrode structure includes an impedance transition section to adjust an impedance associated with the electrode structure. The electrode structure also includes a constant impedance section coupled to the impedance transition section.

In another particular implementation, an electro-optic modulator device includes an electric input configured to receive a signal. The electric input is associated with an input impedance. The electro-optic modulator device includes an impedance transition circuit coupled to the electric input. An input of the impedance transition circuit is associated with the input impedance, and an output of the impedance transition circuit is associated with a first impedance less than the input impedance. The electro-optic modulator device includes a light input configured to receive light. The electro-optic modulator device includes an electro-optic modulator. The electro-optic modulator includes an optical layer coupled to the light input to direct the light into optical waveguides in the optical layer and an electrode structure coupled to the impedance transition circuit. The electrode structure is configured to generate an electrical field based on the signal that modulates the light in the optical waveguides to produce modulated light based on the signal. The electro-optic modulator device also includes a modulated light output configured to direct the modulated light from the optical layer to one or more output optic fibers.

In another particular implementation, a method includes receiving light at a light input of an electro-optic modulator device. The method includes directing the light via the light input into optical waveguides in an optical layer of an electro-optic modulator of the electro-optic modulator device. The method includes receiving a signal at an electric input of the electro-optic modulator device. The electric input is associated with an input impedance. The method includes providing the signal to an electrode structure of the electro-optic modulator. The electrode structure generates an electrical field based on the signal. The electric field modulates light in the optical waveguides to produce modulated light based on the signal. The electrode structure includes a constant impedance section associated with a second impedance less than the input impedance. The method also includes providing the modulated light based on the signal from the optical layer to one or more output optic fibers.

The features, functions, and advantages described herein can be achieved independently in various implementations or may be combined in yet other implementations, further details of which can be found with reference to the following description and drawings. The drawings are conceptual and not drawn to scale.

BRIEF DESCRIPTION OF THE DRAWINGS

FIG. 5 is a flowchart of a method of utilizing the electro-optic modulator device of FIG. 1.

FIG. 6 is a flowchart of a method of a first implementation of providing a signal to a signal electrode of an electrode structure of an electro-optic modulator.

FIG. 7 is a flowchart of a method of a second implementation of providing a signal to a signal electrode of an electrode structure of an electro-optic modulator.

FIG. 8 is a flowchart of a method of a third implementation of providing a signal to a signal electrode of an electrode structure of an electro-optic modulator.

DETAILED DESCRIPTION

Figure 1:
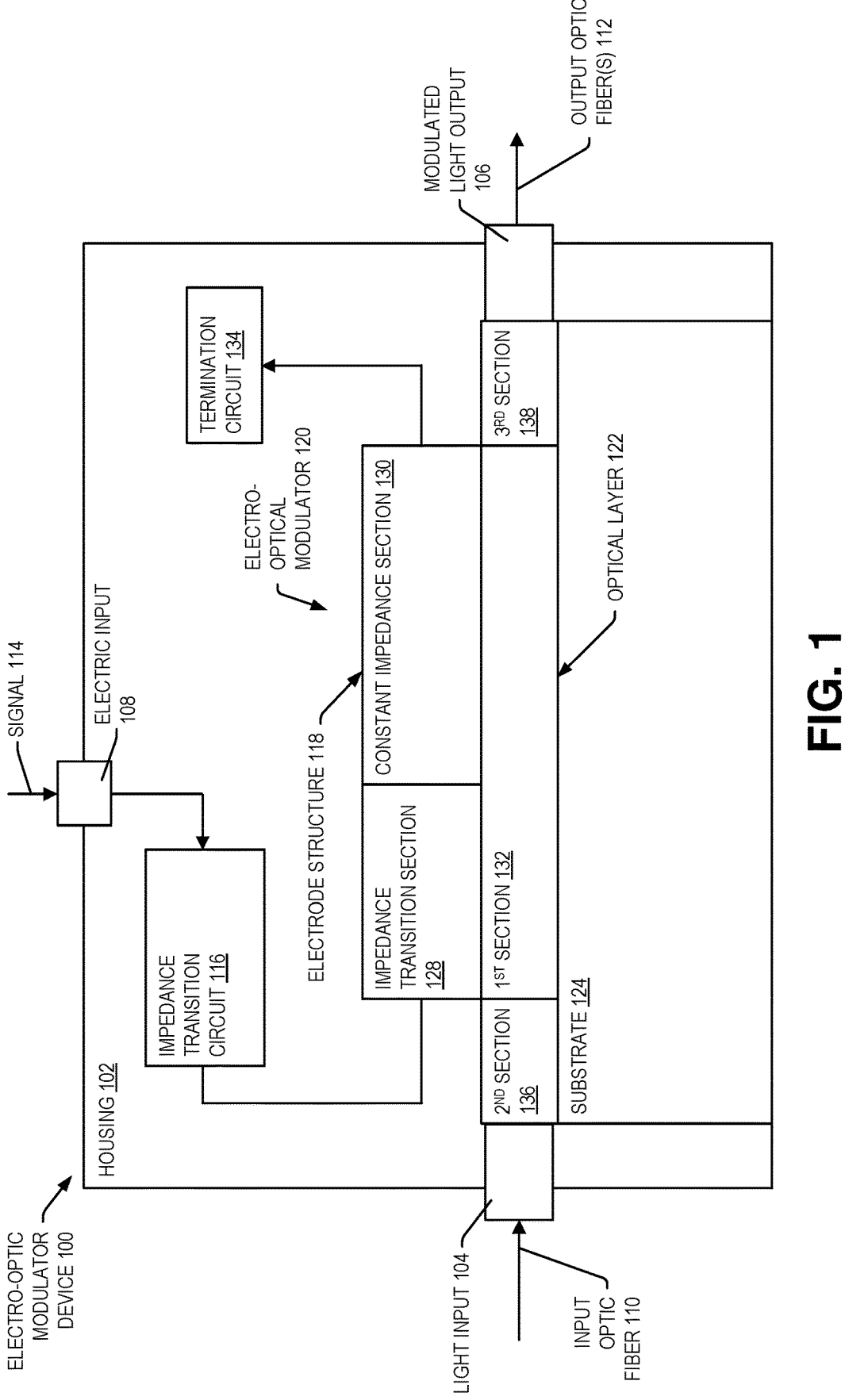
FIG. 1 is a diagram that illustrates a representation of a side view of a particular implementation of an electro-optic modulator device.

An electro-optic modulator has a light input to receive light, one or more light outputs to transfer output modulated light to one or more optic fibers, and an electric input that receives a signal (e.g., a RF signal) associated with data that is to be converted from the electrical domain to the optical domain. The electric input is associated with an input impedance. In typical industry practice, the input impedance of an electro-optical modulator is 50 ohms. Typical electro-optic modulator devices continue to propagate the signal at the input impedance until the signal is terminated at a termination circuit in a 50 ohm resistor. In order to propagate the RF signal along an electro-optic modulator of the electro-optic modulator device, the electro-optic modulator includes an electrode structure that carries the signal. The electrode structure is formed on an optical layer of the electro-optic modulator. The optical layer includes optical waveguides that carry the light that is changed to the output modulated light by an electric field generated by the electrode structure. For an amplitude electro-optic modulator that utilizes a Mach Zehnder interferometer, electrodes of the electrode structure are formed in a ground-signal-ground co-propagation waveguide (CPW) configuration.

The optical waveguides of the electro-optic modulator are formed in the optical layer and are positioned between gaps of the electrode structure. The electric field generated by the electrode structure passes through the optical waveguides and induces phase shift onto the light in the optical waveguides by the electro-optical effect. A strong electrical field produced by the electrode structure causes strong phase shift induced onto the light in the optical waveguides. Modulation efficiency is improved when a strength of the electric field generated by the electrode structure is high and overlap between the electric field and the light passing through the optical waveguides in the optical layer is increased.

The electrical field generated by a CPW electrode structure depends on the gap between the signal electrode and the ground electrodes. For the same voltage difference applied between the signal electrode and the ground electrodes, the smaller the gap the higher the electrical field between the electrodes. At the same time, the impedance of a CPW structure depends on the ratio between the gap width and a width of the signal electrode. For a given signal electrode width, the smaller the gap the smaller the impedance associated with the signal electrode. But, if the electro-optic modulator has to be associated with the input impedance, the size of the gap width for a particular signal electrode width is set, which sets a limit on the electric field strength created between the signal electrode and the ground electrodes that passes through the optical waveguides in the optical layer. Associating the electrode structure of the electro-optic modulator with the input impedance limits an efficiency of the electro-optic modulator device and limits an achievable $V\pi$ at a relatively high value.

To have a high efficiency electro-optic modulator device with a low $V\pi$ value, at least a portion of the electrode structure of electro-optic modulator devices disclosed herein are configured to operate at a second impedance that is lower than the input impedance. An impedance change from the input impedance to the second impedance is controlled to be a substantially adiabatic change to avoid generation of noise, back signals, or both. Particular electro-optic modulator devices are designed so that characteristics result in a balance between electrical field and optical waveguide over-lap, optical and electric field propagation, and electric field loss along the electrode structure, which are functions of the geometrical configuration of the electrode structure. An electro-optic modulator device with a portion of an electrode structure associated with a second impedance having a value (e.g., a 20 to 30 ohm value) that is less than an impedance associated with an electrical input of the electro-optic modulator device (e.g., a 50 ohm impedance) results in an efficient electro-optic modulator device with a Vπ that is 50% to 400% lower than a corresponding Vπ for an electro-optic modulator device with a electro-optic modulator that is associated only with the input impedance.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indi-cates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another ele-ment having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are inter-changeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communi-catively coupled," "electrically coupled," or "physically coupled," and can also (or alternatively) include any com-binations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electri-cally coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram of an electro-optic modulator device 100. The electro-optic modulator device 100 includes a housing 102 with a light input 104, a modulated light output 106, and an electric input 108. In an implementation, light from a light source (e.g., a laser) is provided directly or via an input optic fiber 110 to the light input 104 and modulated light exits the modulated light output 106 via one or more output optic fibers 112. The light input 104 and the modu-lated light output 106 can include couplers (e.g., guides and supports) for optic fibers, optic systems, or both. The electric input 108 receives a signal 114 to be transformed from the electric domain to the optical domain. The electric input 108 is associated with an input impedance (e.g., a 50 ohm impedance). In an implementation, the signal 114 is a broadband RF signal. The electro-optic modulator device 100 is configured to modulate light received at the light input 104 based on the signal 114 received at the electric input 108 to generate modulated light output that is provided via the modulated light output 106 to the one or more output optic fibers 112.

In an implementation, the signal 114 from the electric input 108 is provided to an impedance transition circuit 116. The impedance transition circuit 116 is one or more chips where an input of the impedance transition circuit 116 is associated with the input impedance and an output of the impedance transition circuit 116 is associated with a first impedance less than the input impedance. For example, in a particular implementation, the impedance transition circuit 116 includes a Klopfenstein broadband taper that reduces the impedance from the input impedance (e.g., 50 ohms) to the first impedance (e.g., 40 ohms). In other implementations, the input impedance has a different value (e.g., different from 50 ohms), the first impedance has a different value (e.g., different from 40 ohms), or both. Use of the impedance transition circuit 116 reduces a length associated with the housing 102 as compared to an electro-optic device 100 without an impedance transition circuit 116.

In an implementation, the impedance transition circuit 116 is coupled (i.e., wire bonded) to an electrode structure 118 of an electro-optic modulator 120 to provide the signal 114 from the impedance transition circuit 116 to the elec-trode structure 118 of the electro-optic modulator 120. The electro-optic modulator 120 includes the electrode structure 118, an optical layer 122 coupled to the electrode structure 118, and a substrate 124 coupled to the optical layer 122. In some implementations, the electro-optic modulator device 100 does not include the impedance transition circuit 116, and the signal 114 received at the electrical input 108 is provided directly to the electrode structure 118.

Figure 2:
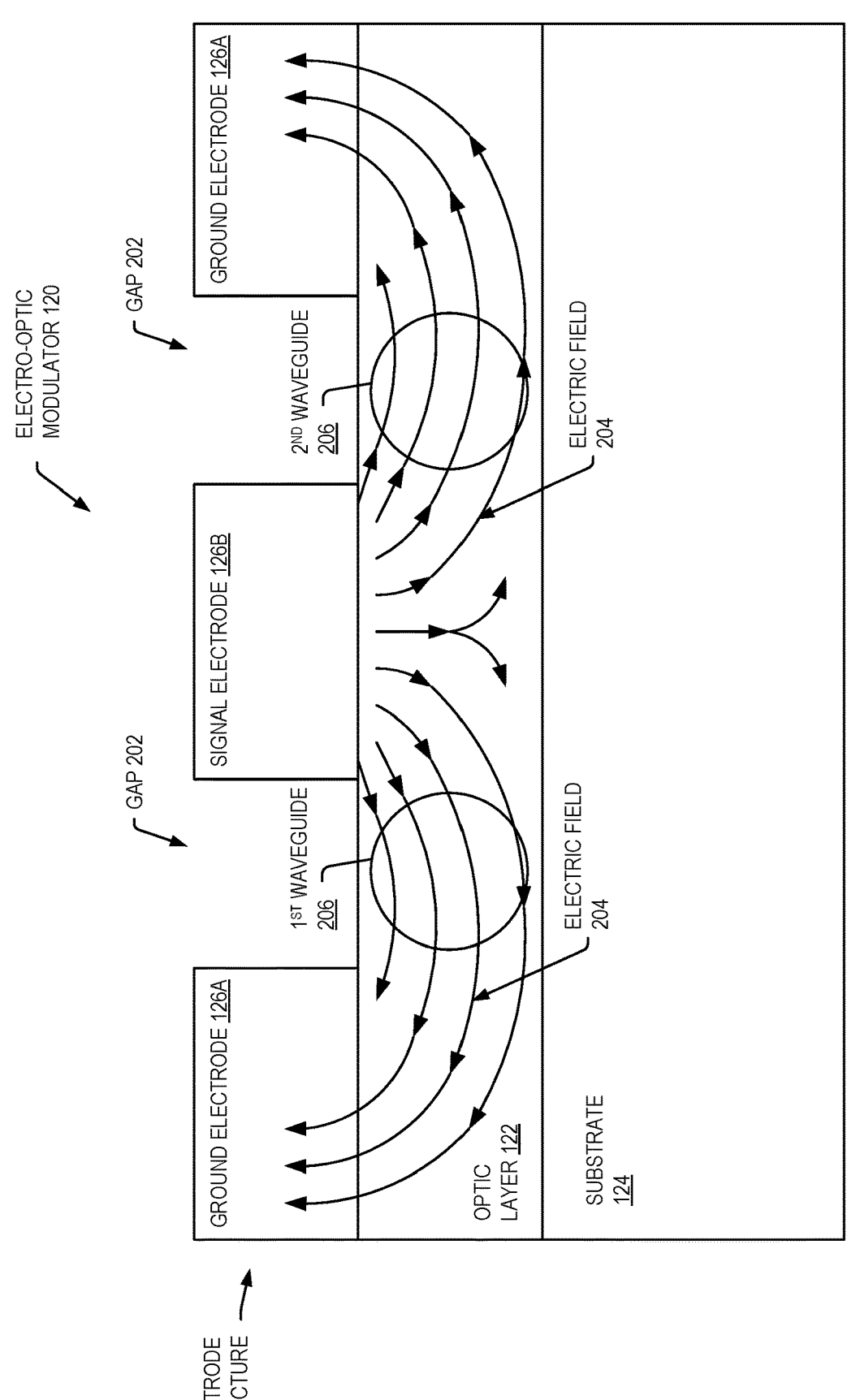
FIG. 2 is a diagram that illustrates a representation of a cross-sectional view of an electro-optic modulator of the electro-optic modulator device of FIG. 1 taken along a plane in a constant gap section of the electro-optic modulator.

As shown in FIG. 2, the electrode structure 118 includes electrodes 126. The electrodes 126 include ground elec-trodes 126A and a signal electrode 126B positioned between the ground electrodes 126A. The signal electrode 126B carries the signal 114 provided in the electric input 108. The electrodes 126 are in a ground-signal-ground co-propagation waveguide (CPW) configuration. The electrode structure 118 is formed on the optical layer 122, or on an interface layer bonded to the optical layer 122, by chemical vapor deposition, electrochemical deposition, other deposition techniques, or combinations thereof. The geometry of the electrode structure 118, including a width of the signal electrode 126B and sizes of gaps 202 between the ground electrodes 126A and the signal electrode 126B, determine the impedance of the electro-optical modulator 120 at a location along the electrode structure 118 and characteristics of an electric field 204 generated by the electrode structure 118.

In some implementations, the electro-optic modulator device 100 includes the interface layer, which is a low relative permeability layer, between the electrode structure 118 and the optical layer 122. For example, the low relative permeability layer can be SiO2 that has a relatively small thickness (e.g., less than 300 nanometers). The layer allows for microwave index tuning and provides surface passivation that reduces or eliminates charge migration along a surface between the signal electrode 126B and the ground electrodes 126A.

Figure 3:
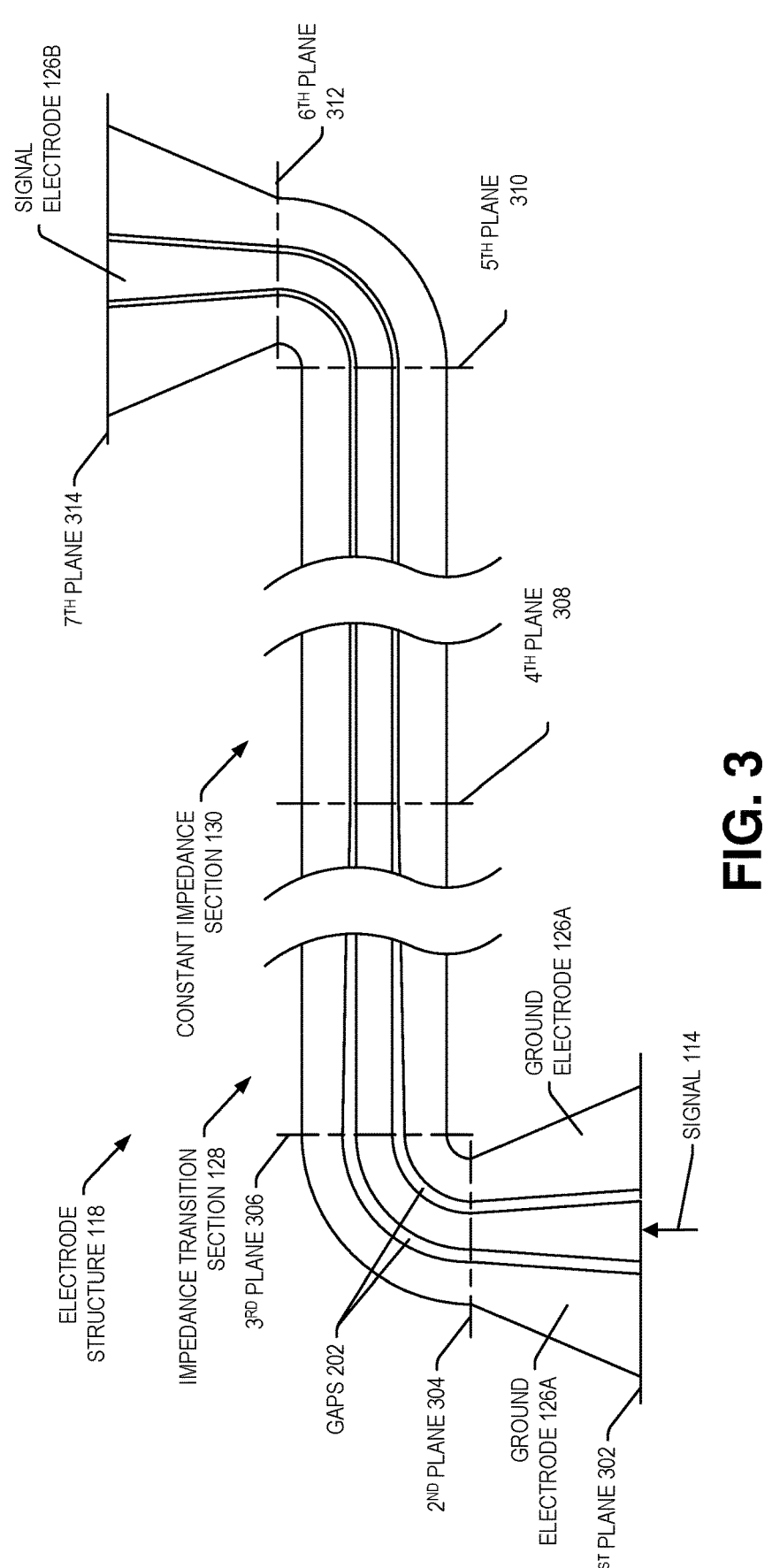
FIG. 3 is a diagram that illustrates a representation of a top view of portions of the electro-optic modulator of FIG. 2.

As depicted in FIG. 1, the electrode structure 118 includes an impedance transition section 128 and a constant impedance section 130. In the impedance transition section 128, as shown in FIG. 3, gap widths of the gaps 202 between the signal electrode 126B and the ground electrodes 126A are gradually (e.g., adiabatically) reduced to change the impedance associated with the electrode structure 118 from the first impedance at an input of the impedance transition section 128 (i.e., at plane 306 of FIG. 3) to a second impedance at an output of the impedance transition section 128 (i.e., at plane 308 of FIG. 3). The gradual reduction of the gap widths of the gaps 202 reduces the impedance associated with the electrode structure 118 along a length of the impedance transition section 128. The reduced gap widths between the signal electrode 126B and the ground electrodes 126A and the reduction of the impedance associated with the electrode structure 118 to the second impedance results in overlap of a strong electric field 204 with optical waveguides (e.g., optical waveguides 206 depicted in FIG. 2) in a first section 132 of the optical layer 122 of the electro-optic modulator 120. The length of the impedance transition section 128, the rate of change of the gap widths of the gaps 202, and a value of the second impedance inhibit RF back reflections and establish a desired length and desired operation bandwidth characteristics of the electro-optic modulator 120.

The constant impedance section 130 is a long section of the electrode structure 118 that includes gaps 202 with constant width between the ground electrodes 126A and the signal electrode 126B. A length of the constant impedance section 130 and the width of the gaps 202 ensure that a high strength electrical field 204 overlaps the waveguides 206 in the first section 132 of the optical layer 122. The length of the constant impedance section 130 and the high strength electrical field 204 provide a high induced phase change per unit volt applied to light passing through the optical waveguides 206 located in the first section 132 of the optical layer 122 and result in a low final Vπ for the electro-optic modulator device 100.

In a particular implementation, the electrode structure 118 only includes the constant impedance section 130 that operates at the second impedance, which is lower than the input impedance associated with the electric input 108. The signal 114 from the electric input 108 is sent to one or more impedance transition circuits 116, where an output of the one or more impedance transition circuits 116 is associated with the second impedance. To accommodate transitioning the input impedance to the second impedance by the one or more impedance transition circuits 116, a length of the housing 102 may be longer than the length of the housing 102 for an implementation where a portion of the impedance reduction is performed on the electro-optic modulator 120, the position of the electric input 108 may be located close to the modulated light output 106, or both.

As depicted in FIG. 1, the electrode structure 118 is coupled (e.g., wire bonded) to a termination circuit 134. The termination circuit 134 inhibits back signals based on a remaining portion of the signal 114 from entering the electrode structure 118. The termination circuit 134 includes a termination resistor with a resistance value substantially equal to the impedance associated with the constant impedance section 130 (e.g., the second impedance).

The electrode structure 118 is coupled to the first section 132 of the optical layer 122. The optical layer 122 is made of a crystal material with an electro-optic crystalline structure. In particular implementations, the optical layer 122 includes or corresponds to lithium niobate (LiNbO$_3$). In other implementations, the crystal material includes or corresponds to barium titanate (BaTiO$_3$), lithium tantalate (LiTaO$_3$), KTP (potassium titanyl phosphate (KTiOPO$_4$)), potassium niobate (KNbO$_3$), a lead lanthanum zirconium titanate (PLZT)-type material, such as Pb$_{(1-x)}$La$_x$(Zr$_{(1-y)}$Ti$_y$)$_{(1-x/4)}$O$_3$, a barium strontium titanate (BST)-type material, such as Ba$_{(1-x)}$Sr$_x$TiO$_3$, where Li indicates lithium, Nb indicates niobium, O indicates oxygen, Ba indicates barium, Ta indicates tantalum, K indicates potassium, Pb indicates lead, La indicates lanthanum, Zr indicates zirconium, and Ti indicates titanium, or an organic crystal (e.g., diethylaminosulfur trifluoride (DAST)).

In particular implementations, the optical layer 122 has a thickness that accommodates a core of the input optic fiber 110 that carries light to the light input 104 and a core(s) of the one or more output optic fibers 112 that carry the modulated light produced by the electro-optic modulator device 100 without the need for lensed fibers, lens systems, or both, to transfer light to or from the optical layer 122. For example, the thickness of the optical layer 122 is greater than or equal to the diameter of the core of the input optic fiber 110. In particular implementations, the thickness of the optical layer 122 is from 5 to 10 microns (e.g., about 7 microns to accommodate a circular core of the input optic fiber 110 and the cores of the one or more output optic fibers with simplified assembly and without the need for complicated coupling equipment). In other implementations, the thickness of the optical layer 122 is smaller than a core of the input optic fiber 110 to the light input 104. In some implementations, one or more lensed fibers, lens systems, or both, are used to facilitate transition of the light to the optical layer 122, transition of the modulated light output from the optical layer 122 to the one or more output optic fibers 112 at the modulated light output, or both.

As shown in FIG. 1, the optical layer includes the first section 132, a second section 136, and a third section 138. Each section 132, 136, 138 of the optical layer 122 includes optical waveguides, such as optical waveguides 206 shown in FIG. 2, for light that is to be modulated, is being modulated, or has been modulated by the electro-optic modulator device 100. The optical waveguides are formed in the optical layer 122. In some implementations, the optical waveguides are formed by in-diffusion of titanium, proton exchange, ion implantation, formation of laser-written waveguides, or by other techniques.

The optical waveguides of the second section 130 include an optical splitter that separates the light from the light input 104 into a first optical waveguide 206 and a second optical waveguide 206. In the implementation depicted in FIG. 2, the optical waveguides 206 are shown as having circular cross-sectional shapes within the optical layer 122. In other implementations, the cross-sectional shapes of the optical waveguides 206 are ovoid, rectangular, or an irregular shape, and the optical waveguides 206 may extend to an upper surface, a lower surface, or both, of the optical layer 122.

The signal electrode 126B of the electrode structure 118 is located between the first optical waveguide 206 and the second optical waveguide 206. The first optical waveguide 206 is positioned in the optical layer 122 between the signal electrode 126B and a first ground electrode of the ground electrodes 126A and the second optical waveguide 206 is positioned in the optical layer 122 between the signal electrode 126B and a second ground electrode of the ground electrodes 126A. In other words, if the electrode structure 118 is considered to be on top of the optical layer 122, the first optical waveguide 206 is located in the optical layer 122 below the gap 202 between the first ground electrode of the ground electrodes 126A and the signal electrode 126B, and the second optical waveguide 206 is located in the optical layer 122 below the gap 202 between the signal electrode 126B and the second ground electrode of the ground electrodes 126A.

As depicted in FIG. 1, the optical layer 122 includes the third section 138. Optical waveguides in the third section 138 provide modulated light to the modulated light output 106 where modulated light based on the signal 114 transitions from the optical layer 122 to the one or more output optic fibers 112. In an implementation, the third section 138 includes a combiner that combines the modulated light based on the signal 114 in the first optical waveguide 206 and the second optical waveguide 206 and provides combined modulated light based on the signal 114 to an output optic fiber 112 via the modulated light output 106. In another implementation, the modulated light based on the signal 114 from the first optical waveguide 206 is provided to a first output optic fiber 112 via the modulated output 106 and the modulated light based on the signal 114 from the second optical waveguide 206 is provided to a second output optic fiber 112 via the modulated light output 106.

The optical layer 122 is coupled to (e.g., bonded to) the substrate 124. The substrate 124 provides strength for the electro-optic modulator 120, other selected physical and optical properties, or both. In an implementation, the substrate 124 is a quartz substrate. In other implementations, the substrate is the same material as the optical layer 122, silicon, or other material.

During production of some implementations of the electro-optic modulator 120, the optical layer 122 is subjected to heat intensive processes during formation of the optical waveguides 206 in the optical layer 122 (e.g., during titanium in-diffusion formation of optical waveguides). During a material selection phase of a design stage of the electro-optic modulator 120, thermal expansion characteristics of the optical layer 122 and the substrate 124, the plane of the crystalline cut of the optical layer 122 and the substrate 124, thickness of the substrate 124, and other factors are considered during selection of materials for the electro-optical modulator 120 to inhibit problems (e.g., cracking and breakage) caused by thermal stresses due to thermal processing of the electro-optic modulator 120 (e.g., thermal processes to form the optical waveguides 206 in the optical layer 122).

For example, in a particular implementation, the optical layer 122 is X-cut lithium niobate directly bonded to a substrate 124 of X-cut quartz, where a crystallographic axis of the first crystal structure is aligned with a crystallographic axis of the second crystal structure. The use of X-cut lithium niobate and X-cut quartz with aligned crystallographic axes inhibits breakage of electro-optic modulators 120 during production due to thermal stresses. In addition, quartz has a relative permeability in the range of 4.5 to 4.6, which results in a reduction of an effective microwave index for the electric field 204 generated by the electrode structure 118 in the optical layer 122 as compared to an electro-optic modulator with an additional thickness of lithium niobate as the substrate. The effective microwave index for the electric field 204 in the optical layer 122 due to the reduction of the effective microwave index by the substrate 124 being quartz is similar or equal to the optical index of the optical layer 122 to improve matching of optical field propagation and electric field propagation for the electro-optical modulator 120.

Also, other physical and optical properties of the substrate 124 are considered during the design stage so that there is co-propagation in phase of both the optical and electrical fields in the optical layer 122. In some implementations, portions of the optical layer 122 that contact portions of the electrode structure 118 are treated (e.g., made amorphous with high energy selective ion implementation of hydrogen, carbon, or other material) prior to forming the electrode structure 118 on the optical layer 122 to improve matching of optical field propagation and electric field propagation for the electro-optical modulator 120.

FIG. 2 illustrates a cross-sectional view of the electro-optic modulator 120 of FIG. 1. The electric field 204 generated by the electrode structure 118 passes through the optical waveguides 206 in the optical layer 122 transverse to a direction of travel of light through the optical waveguides 206. The electric field 204, which is based on the signal 114 received at the electric input 108 of FIG. 1, modulates the light traveling in the optical waveguides 206 due to an electro-optic effect to produce modulated light based on the signal 114.

FIG. 3 illustrates a top view of the electro-optic modulator 120 of FIG. 1. The signal 114 received at the electric input 108 is provided to the signal electrode 126B of the electrode structure 118 at plane 302. In an implementation, an impedance associated with the first plane 302 is the first impedance associated with an output of the impedance transition circuit 116. In an implementation without the impedance transition circuit 116, the first impedance associated with the first plane is the input impedance.

The dimensions of the electrodes 126 are changed between plane 302 and plane 304 so that impedance associated with plane 302 is the first impedance. The width of the signal electrode 126B at plane 304 has a particular width value. The particular width value of the signal electrode 120B remains constant until the signal electrode 120B reaches plane 312. The particular width value is typically between 80 microns and 300 microns.

A direction of the electrodes 126 is changed from plane 304 to plane 306. Plane 306 is the input of the impedance transition section 128. Widths of the gaps 202 between the signal electrode 126B and the ground electrodes 126A gradually (e.g., adiabatically) decrease in the impedance transition section 128 to change the impedance associated with the electrode structure 118 at plane 308 to a second impedance. The widths of the gaps 202 are decreased by gradually increasing widths of the ground electrodes 126A. When the electrode structure 118 includes impedance transition section 128, a length of the impedance transition section 128 is typically between 4 mm (millimeters) and 20 mm. The impedance reduction made by the impedance transition section 128 is a particular value between 1 ohm and 25 ohms, for example 10 ohms.

The impedance transition section 128 ends at plane 308, and the constant impedance section 130 starts. The gaps 202 between the signal electrode 126B and the ground electrodes 126A are kept at constant values in the constant impedance section 130. As depicted in FIG. 1 and FIG. 2, the electrodes 126 in the impedance transition section 128 and the constant impedance section 130 are positioned in a working relation to the optical layer 122 to modulate light passing through the optical waveguides 206 in the optical layer 122. The length of the constant impedance section 130 is typically between about 15 mm and 60 mm.

As shown in FIG. 3, a second direction transition for the electrodes 126 occurs between plane 310 and plane 312. Widths of the electrodes 126 are changed from plane 312 to plane 314 so that the impedance associated with plane 314 is the second impedance. After plane 314, the electrode 120B is coupled to the termination circuit 134 of FIG. 1.

The input impedance can be an industry standard, such as 50 ohm. The first impedance is a selected value, such as 40 ohm, but other values that are less than the input impedance can also be selected. The second impedance is also a selected value that has a lower limit impedance value based on factors dependent on the geometrical configuration of the electrodes 126. Such factors include electrical and optical field overlap, electrical field and optical field phase matching, signal loss along the electro-optic modulator, and size and position of the gaps 202 relative to the optical waveguides 206 in the optical layer 122. A particular selected value for the second impedance is 30 ohm, but other values can also be selected that are above the lower limit impedance value.

The width of the signal electrode 126B is selected from values in a range between about 90 to 300 microns. Once a particular width value is selected, the gap width of the electrode structure 118 is determined to result in the selected second impedance value. A wide second electrode 126B reduces an overall microwave loss for the electro-optic modulator 120.

For a particular implementation of the electro-optic modulator device 100, the input impedance associated with the electric input 108 is 50 ohm. The signal 114 provided to the electric input 108 is sent to the impedance transition circuit 116. An output of the impedance transition circuit 116 is associated with a first impedance of 40 ohms. From the impedance transition circuit 116, the signal 114 is provided to the second electrode 126B of the electrode structure 118 of the electro-optic modulator 120. Table 1 shows dimensions of an implementation of the electrode structure 118 at the various planes 302-314 depicted in FIG. 3. In Table 1, gap width refers to a width of a gap 202 between the signal electrode 120B and either of the ground electrodes 120A, and the distance to previous plane refers to lengths of a central axis of the second electrode 120B between designated planes.

TABLE 1

| | Plane 302 | Plane 304 | Plane 306 | Plane 308 | Plane 310 | Plane 312 | Plane 314 |
|---|---|---|---|---|---|---|---|
| Gap width (microns) | 44 | 22 | 22 | 13 | 13 | 13 | 23 |
| Distance to previous plane (microns) | | 600 | 570 | 10000 | 40000 | 570 | 600 |
| Signal electrode width (microns) | 200 | 100 | 100 | 100 | 100 | 100 | 400 |
| Ground electrode width (microns) | 500 | 300 | 300 | 309 | 309 | 309 | 500 |

In some implementations, one or more electro-optic modulator devices 100 are used as part of an in-phase and quadrature (I/Q) modulator circuit of a high speed coherent communication system. For example, an I/Q modulator circuit can be formed using two electro-optic modulator devices 100. The electro-optic modulator devices 100 utilize constant impedance sections associated with a second impedance that is lower than an input impedance associated with electric inputs for the electro-optic modulator devices 100. The electro-optic modulator devices 100 that are associated with the second impedance have improved modulator efficiency as compared to electro-optic modulator devices that are only associated with the input impedance of the electric input. The increased modulator efficiency of the electro-optic modulator devices 100 lowers a required voltage per bit for the I/Q modulator circuit, which reduces operation requirements for electronic drivers that provide electrical signals to the I/Q modulator circuit. A net effect is overall power reduction for a transceiver and communications link of the communication system.

Figure 4:
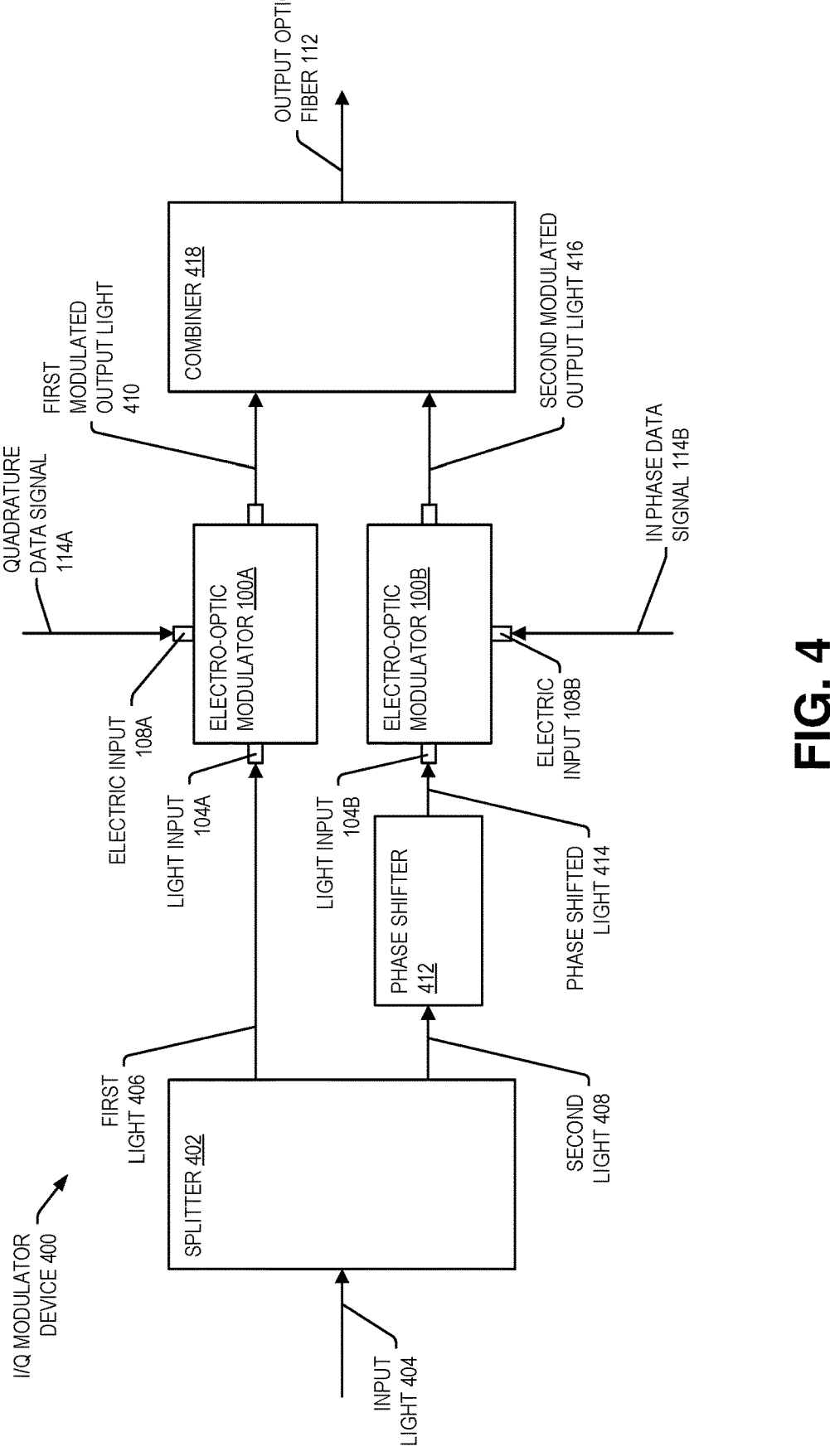
FIG. 4 is a diagram of a representation of an in-phase and quadrature (I/Q) modulator device that includes two electro-optic modulators.

FIG. 4 depicts a diagram of an I/Q modulator device 400. The I/Q modulator device 400 includes a splitter 402 that splits input light 404 into first light 406 and second light 408. The first light 404 is directed to a light input 104A of a first electro-optic modulator device 100A. An electric input 108A of the first electro-optic modulator device 100A receives a quadrature data signal 114A. The first electro-optic modulator device 100A modulates the first light 406 based on the quadrature data signal 114A to produce first modulated output light 410.

The second light 408 is directed to a phase shifter 412. The phase shifter 412 shifts a phase of the second light 408 by 90 degrees relative to the first light 406 to produce phase shifted light 414. The phase shifted light 414 is provided to a light input 104B of a second electro-optic modulator device 100B. An electric input 108B of the second electro-optic modulator device 100B receives an in phase data signal 114B. The electro-optic modulator device 100B modulates the phase shifted light 414 based on the in phase data signal 114B to produce second modulated output light 416.

A combiner 418 receives the first modulated output light 410 and the second modulated output light 416. The combiner 418 combines the output light 410, 416 into an output signal that is carried by the output optic fiber 112.

FIG. 5 is a flow chart of an example of a method of utilizing an electro-optic modulator, such as the electro-optic modulator 100 of FIG. 1 and the electro-optic modulators 100A, 100B of FIG. 4. The method 500 includes, at block 502, receiving light at a light input of the electro-optic modulator device. The light is directed into waveguides of an optical layer of an electro-optic modulator via the light input, at block 504.

The method 500 includes, at block 506, receiving a signal at an electric input of the electro-optic modulator device. The electric input is associated with an input impedance. For example, the input impedance is 50 ohms. The signal is an RF signal that includes data to be transformed from the electrical domain to the optical domain.

The method 500 includes, at block 508, providing the signal to a signal electrode of an electrode structure of the electro-optic modulator. The electrode structure includes a constant impedance section associated with a second impedance less than the first impedance.

FIG. 6 is a flow chart of a first implementation of a method 600 of providing the signal to the signal electrode of the electrode structure of the electro-optic modulator, as in block 508 of FIG. 5. The method 600 includes, at block 602, providing the signal from the electrical input to an impedance transition circuit. An input of the impedance transition circuit is associated with the input impedance and an output of the impedance transition circuit is associated with a first impedance that is less than the input impedance. In a particular implementation, for example, the input impedance is 50 ohms and the first impedance is 40 ohms. In the particular implementation, the impedance transition circuit includes a CPW structure with a Klopfenstein broadband taper of gaps between electrodes of the CPW structure that causes a gradual, adiabatic reduction of an associated impedance from the input impedance to the first impedance.

The method 600 includes, at block 604, providing the signal from the impedance transition circuit to the signal electrode of an impedance transition section of the electrode structure. An input of the impedance transition section is associated with the first impedance and an output of the impedance transition section is associated with the second impedance. In a particular example of the first implementation, the first impedance is 40 ohms and the second impedance is 30 ohms. The impedance transition section includes a CPW structure with a Klopfenstein broadband taper that causes a gradual, adiabatic reduction of an associated impedance from the first impedance to the second impedance. The output of the impedance transition section is the input of the constant impedance section associated with the second impedance.

FIG. 7 is a flow chart of a second implementation of a method 700 of providing the signal to the signal electrode of the electrode structure of the electro-optic modulator, as in block 508 of FIG. 5. The method 700 includes, at block 702, providing the signal from the electrical input to a first impedance transition circuit of one or more impedance transition circuits. An input of the first impedance transition circuit is associated with the input impedance and an output of a last impedance transition circuit of the one or more impedance transition circuits is associated with the second impedance. Each of the impedance transition circuits of the one or more impedance transition circuits is configured to adiabatically reduce a particular input impedance associated with the impedance transition circuit to a particular output impedance associated with the impedance transition circuit.

The method 700 includes, at block 704, providing the signal from the last impedance transition circuit of the one or more impedance transition circuits to the signal electrode at an input of the constant impedance section of the electrode structure of the electro-optic modulator. In the second implementation, the electrode structure of the electro-optic modulator does not include an impedance transition section.

FIG. 8 is a flow chart of a third implementation of a method 800 of providing the signal to the signal electrode of the electrode structure of the electro-optic modulator, as in block 508 of FIG. 5. The method 800 includes, at block 802, providing the signal from the electrical input to the signal electrode of an impedance transition section of the electrode structure. An input of the impedance transition section is associated with the input impedance and an output of the impedance transition section is associated with the second impedance. The output of the impedance transition section is the input of the constant impedance section. In an example of the third implementation, the input impedance is 50 ohms and the second impedance is 30 ohms, and the impedance transition section includes a CPW structure with a Klopfenstein broadband taper that causes a gradual, adiabatic reduction of an associated impedance from the input impedance to the second impedance. A length of the electro-optic modulator device of the third implementation is longer than lengths of the electro-optic modulator devices of the first implementation and the second implementation.

Returning to the method 500 of FIG. 5 at block 510, the electrode structure generates an electric field based on the signal. The electric field modulates the light in the optical waveguides to generate modulated light based on the signal.

The method 500, at block 512, includes directing the modulated light based on the signal to one or more output optic fibers. The method 500 also includes, at block 514, providing the signal from the signal electrode to a termination circuit. The termination circuit inhibits back reflections of the signal to the signal electrode by canceling a remaining portion of the signal using a resistor. A resistance value of the resistor is the value of the second impedance.

Implementations of electro-optic modulator devices include devices with an electrical input associated with an input impedance (e.g., 50 ohms). The devices include electro-optic modulators with electrode structures that include constant impedance sections that are associated with a second impedance, which is less than the input impedance. Reducing an impedance from an input impedance to the second impedance associated with at least a portion of the electrode structure of the electro-optic modulator enables gaps between electrodes of the electrode structure to be smaller as compared to gaps between electrodes of a conventional electro-optic modulator device associated only with the input impedance. The smaller gaps cause the electric field that passes through the optical waveguides positioned in the optical layer between the gaps to be stronger than the corresponding electric field generated by the conventional electro-optic modulator device. The stronger electric field provides for a higher induced phase change of the light passing through the optical waveguides per unit volt applied and a reduced $V\pi$ (e.g., by from 50% to 400%) as compared to the conventional electro-optic modulator devices.

Figure 9:
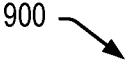
FIG. 9 is a diagram of a representation of a system that includes the electro-optic modulator device of FIG. 1.

FIG. 9 is an illustration of a block diagram of a computing environment 900 including a general purpose computing device 902 configured to support implementations of computer-implemented methods and computer-executable program instructions (or code) according to the present disclosure. For example, the computing device 902, or portions thereof, may execute instructions to perform, or cause equipment to perform, operations described with reference to FIGS. 1-8 and with operations to produce and use the electro-optic modulator devices depicted in FIGS. 1-4.

The computing device 902 includes a processor 904. The processor 904 communicates with a system memory 906, one or more storage devices 908, one or more input/output interfaces 910, one or more communications interfaces 912, or a combination thereof. The system memory 906 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 906 includes an operating system 914, which may include a basic input/output system for booting the computing device 902 as well as a full operating system to enable the computing device 902 to interact with users, other programs, and other devices. The system memory 906 includes one or more applications 916 (e.g., instructions) which are executable by the processor 904.

The processor 904 communicates with the one or more storage devices 908. For example, the one or more storage devices 908 are non-transitory computer readable media that can include nonvolatile storage devices, such as magnetic disks, optical disks, or flash memory devices. The storage devices 908 can include both removable and non-removable memory devices. The storage devices 908 can be configured to store an operating system, images of operating systems, applications, and program data. In particular implementations, the system memory 906, the storage devices 908, or both, include tangible computer-readable media incorporated in hardware and which are not signals.

The processor 904 communicates with the one or more input/output interfaces 910 that enable the computing device 902 to communicate with one or more input/output devices 918 to facilitate user interaction. The input/output interfaces 910 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 918 can include keyboards, pointing devices, displays, speakers, microphones, touch screens, and other devices. The processor 904 detects interaction events based on user input received via the input/output interfaces 910. Additionally, the processor 904 send a display to a display device via the input/output interfaces 910.

The processor 904 can communicate with one or more devices 920 via the one or more communications interfaces 912. The one or more devices 920 can include host computers, servers, workstations, controllers, manufacturing devices, other computing devices, or combinations thereof. In a particular implementations, the one or more devices 920 includes an electro-optic modulator 100 that receives a signal (e.g., an RF signal) from the communications interface 912 that corresponds to data to be sent to another device via an optic fiber. In another particular implementation, the one or more devices 920 includes an I/Q modulation device 400 that receives in phase data, quadrature data, or both, from the communications interface 912.

The one or more communications interfaces 912 may include wired Ethernet interfaces, IEEE 802 wireless interfaces, other wireless communication interfaces, one or more converters to convert electrical signals to optical signals, one or more converters to convert received optical signals to electrical signals, or other network interfaces. In some implementations, the one or more converters to convert electrical signals to optical signals of the communications interfaces 912 include the electro-optical modulation device 100, as depicted in FIG. 9, the I/Q modulation device 400, or both. The processor 904 causes an electric input of the electro-optic modulation device 100 to receive a signal (e.g., an RF signal) that corresponds to data to be sent to one or more devices of the devices 920. The electro-optic modulation device 100 converts the signal to modulated optical light based on the signal that is provided to the one or more devices of the devices 920 via one or more output optic fibers of the electro-optic modulation device 100.

Aspects of the disclosure are described further with reference to the following set of interrelated clauses:

According to Clause 1, an electro-optic modulator device includes: an optical layer, wherein the optical layer includes optical waveguides; and an electrode structure coupled to the optical layer, wherein the electrode structure includes a signal electrode disposed between a pair of ground electrodes, wherein the electrode structure is configured to generate an electric field based on a signal carried by the signal electrode, wherein the electric field is configured to modulate light in the optical waveguides to produce modulated light based on the signal, and wherein the electrode structure includes: an impedance transition section configured to reduce an impedance associated with the electrode structure from a first impedance at an input of the impedance transition section to a second impedance at an output of the impedance transition section; and a constant impedance section associated with the second impedance.

Clause 2 includes the electro-optic modulator device of Clause 1, further including an electric input configured to receive the signal, wherein the electric input is associated with an input impedance.

Clause 3 includes the electro-optic modulator device of Clause 2, wherein the signal includes a radio frequency (RF) signal.

Clause 4 includes the electro-optic modulator device of Clause 2 or Clause 3, further including an impedance transition circuit coupled to the electric input and to the impedance transition section, wherein an input of the impedance transition circuit is associated with the input impedance, wherein an output of the impedance transition circuit is associated with the first impedance, and wherein the first impedance is less than the input impedance.

Clause 5 includes the electro-optic modulator device of any of Clauses 1 to 4, further including a termination circuit coupled to an end of the signal electrode.

Clause 6 includes the electro-optic modulator device of any of Clauses 1 to 5, further including a light input configured to facilitate transfer of the light from an input optic fiber to the optical waveguides of the optical layer.

Clause 7 includes the electro-optic modulator device of any of Clauses 1 to 6, further including a modulated light output configured to facilitate transfer of modulated light based on the signal from the optical layer to one or more output optic fibers.

Clause 8 includes the electro-optic modulator device of any of Clauses 1 to 7, further including a substrate coupled to the optical layer.

Clause 9 includes the electro-optic modulator device of any of Clauses 1 to 8, wherein a thickness of the optical layer is between 5 microns and 10 microns.

Clause 10 includes the electro-optic modulator device of any of Clauses 1 to 9, wherein the signal electrode is coupled to a portion of the optical layer between the optical waveguides, wherein gaps are located between the signal electrode and ground electrodes, and wherein the optical waveguides are located in the optical layer between the gaps.

Clause 11 includes the electro-optic modulator device of Clause 10, wherein widths of the gaps gradually decrease in the impedance transition section.

According to Clause 12, an electro-optic modulator device includes: an electric input configured to receive a signal, wherein the electric input is associated with an input impedance; an optical layer, wherein the optical layer includes optical waveguides; and an electrode structure coupled to the optical layer, wherein the electrode structure includes a signal electrode disposed between ground electrodes, wherein the signal electrode is configured to carry the signal, wherein the electrode structure is configured to generate an electric field based on the signal, wherein the electric field is configured to modulate light passing through the optical waveguides to produce modulated light based on the signal, and wherein the electrode structure includes a constant impedance section associated with a second impedance that is less than the input impedance.

Clause 13 includes the electro-optic modulator device of Clause 12, further including an impedance transition circuit coupled to the electric input, wherein an input of the impedance transition circuit is associated with the input impedance, and wherein an output of the impedance transition circuit is associated with a first imped-
ance that is less than the input impedance.

Clause 14 includes the electro-optic modulator device of
Clause 13, wherein the electrode structure includes an
impedance transition section, wherein an input of the
impedance transition section is associated with the first
impedance, wherein an output of the impedance tran-
sition section is associated with the second impedance,
and wherein the second impedance is less than the first
impedance.

Clause 15 includes the electro-optic modulator device of
Clause 14, wherein a width of the signal electrode in
the impedance transition section is a constant width,
and wherein the constant width is a value between 80
microns and 300 microns.

Clause 16 includes the electro-optic modulator device of
any of Clauses 12 to 15, further including a termination
circuit coupled to an end of the signal electrode.

Clause 17 includes the electro-optic modulator device of
any of Clauses 12 to 16, further including a light input
configured to facilitate transition of the light from an
input optic fiber to the optical waveguides of the optical
layer.

Clause 18 includes the electro-optic modulator device of
any of Clauses 12 to 17, further including a modulated
light output configured to facilitate transition of the
modulated light based on the signal from the optical
layer to one or more output optic fibers.

Clause 19 includes the electro-optic modulator device of
any of Clauses 12 to 18, further including a substrate
coupled to the optical layer.

Clause 20 includes the electro-optic modulator device of
any of Clauses 12 to 19, wherein a width of the signal
electrode in the constant impedance section is a con-
stant width, and wherein the constant width is a value
between 80 microns and 300 microns.

Clause 21 includes the electro-optic modulator device of
any of Clauses 12 to 20, wherein the optical layer
includes one of lithium niobate, barium titanate, potas-
sium titanyl phosphate, potassium niobate, a lead lan-
thanum zirconium titanate type material, a barium
strontium titanate type material, or an organic crystal.

According to Clause 22, an electro-optic modulator
device includes: a quartz substrate having a first crystal
structure; a lithium niobate layer coupled to the quartz
substrate, wherein the lithium niobate layer includes a
plurality of optical waveguides, and wherein the
lithium niobate layer has a second crystal structure; and
an electrode structure coupled to the lithium niobate
layer, wherein the electrode structure includes a signal
electrode configured to carry a signal and ground
electrodes, wherein the electrode structure is positioned
in working relation to optical waveguides in a first
section of the lithium niobate layer, wherein the elec-
trode structure is configured to generate an electric field
based on the signal between the signal electrode and the
ground electrodes, wherein the electric field is config-
ured to modulate light in the plurality of optical wave-
guides to produce modulated light based on the signal,
wherein the electrode structure includes an impedance
transition section configured to adjust an impedance
associated with the electrode structure, and wherein the
electrode structure includes a constant impedance sec-
tion coupled to the impedance transition section.

Clause 23 includes the electro-optic modulator device of
Clause 22, wherein a crystallographic axis of the first crystal structure is aligned with a crystallographic axis
of the second crystal structure.

Clause 24 includes the electro-optic modulator device of
Clause 22 or Clause 23, wherein a thickness of the
lithium niobate layer is equal to or greater than a
diameter of a core of an input optic fiber that provides
the light to the lithium niobate layer.

Clause 25 includes the electro-optic modulator device of
any of Clauses 22 to 24, wherein an impedance asso-
ciated with an input of the impedance transition section
is a first impedance, and wherein an output of the
impedance transition section and the constant imped-
ance section are associated with a second impedance
that is less than the first impedance.

According to Clause 26, an electro-optic modulator
device includes: an electric input configured to receive
a signal, wherein the electric input is associated with an
input impedance; an impedance transition circuit
coupled to the electric input, wherein an input of the
impedance transition circuit is associated with the input
impedance and an output of the impedance transition
circuit is associated with a first impedance less than the
input impedance; a light input configured to receive
light; an electro-optic modulator, wherein the electro-
optic modulator includes an optical layer coupled to the
light input and configured to direct the light into optical
waveguides in the optical layer and an electrode struc-
ture coupled to the impedance transition circuit,
wherein the electrode structure is configured to gener-
ate an electrical field based on the signal that modulates
the light in the optical waveguides to produce modu-
lated light; and a modulated light output configured to
direct the modulated light from the optical layer to one
or more output optic fibers.

Clause 27 includes the electro-optic modulator device of
Clause 26, wherein the electrode structure includes a
signal electrode disposed between ground electrodes.

Clause 28 includes the electro-optic modulator device of
Clause 26 or Clause 27, wherein the electrode structure
includes an impedance transition section and a constant
impedance section, wherein an input of the impedance
transition section is associated with the first impedance,
and wherein an output of the impedance transition
section and the constant impedance section are associ-
ated with a second impedance less than the first imped-
ance.

Clause 29 includes the electro-optic modulator device of
Clause 28, wherein gaps between a signal electrode and
ground electrodes of the electrode structure at the input
of the impedance transition section have a first width,
wherein the gaps at the output of the impedance tran-
sition section have a second width smaller than the first
width, and wherein the gaps gradually reduce from the
first width to the second width along a length of the
impedance transition section.

Clause 30 includes the electro-optic modulator device of
Clause 28 or Clause 29, wherein a length of the
impedance transition section is smaller than a length of
the constant impedance section.

Clause 31 includes the electro-optic modulator device of
any of Clauses 26 to 30, wherein the electric input, the
impedance transition circuit, the light input, and the
electro-optic modulator are integrated in a first housing,
and further including a phase shifter coupled to a
second housing, wherein the phase shifter is configured
to receive the light, wherein the second electro-optic
modulator device includes a second electric input configured to receive a second signal, a second light input configured to receive output light from the phase shifter, and a second electro-optic modulator, and wherein the modulated light from the optical layer is configured to be combined with second modulated light from the second electro-optic modulator and directed to the one or more output optic fibers.

According to Clause 32, a method includes: receiving light at a light input of an electro-optic modulator device; directing the light via the light input into optical waveguides in an optical layer of an electro-optic modulator of the electro-optic modulator device; receiving a signal at an electric input of the electro-optic modulator device, wherein the electric input is associated with an input impedance; providing the signal to an electrode structure of the electro-optic modulator, wherein the electrode structure generates an electrical field based on the signal, wherein the electric field modulates light in the optical waveguides to produce modulated light based on the signal, and wherein the electrode structure includes a constant impedance section associated with a second impedance less than the input impedance; and providing the modulated light based on the signal from the optical layer to one or more output optic fibers.

Clause 33 includes the method of Clause 32, further including providing the signal from the electric input to an impedance transition circuit, wherein an input of the impedance transition circuit is associated with the input impedance, and wherein an output of the impedance transition circuit is associated with a first impedance less than the input impedance.

Clause 34 includes the method of Clause 33, wherein the first impedance is the second impedance.

Clause 35 includes the method of Clause 33, further including providing the signal from the impedance transition circuit to a signal electrode of an impedance transition section of the electrode structure, wherein an input of the impedance transition section is associated with the first impedance, and wherein an output of the impedance transition section is associated with the second impedance.

Clause 36 includes the method of any of Clauses 33 to 35, further including providing the signal from an output of the constant impedance section to an end of the signal electrode of the electrode structure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An electro-optic modulator device comprising:
an optical layer, wherein the optical layer includes optical waveguides; and
an electrode structure coupled to the optical layer, wherein the electrode structure includes a signal electrode disposed between a pair of ground electrodes, wherein the electrode structure is configured to generate an electric field based on a signal carried by the signal electrode, wherein the electric field is configured to modulate light in the optical waveguides to produce modulated light based on the signal, and wherein the electrode structure comprises:
an impedance transition section configured to reduce an impedance associated with the electrode structure from a first impedance at an input of the impedance transition section to a second impedance at an output of the impedance transition section; and
a constant impedance section associated with the second impedance, wherein a length of the impedance transition section is smaller than a length of the constant impedance section.

2. The electro-optic modulator device of claim 1, further comprising an electric input configured to receive the signal, wherein the electric input is associated with an input impedance.

3. The electro-optic modulator device of claim 2, wherein the signal comprises a radio frequency (RF) signal.

4. The electro-optic modulator device of claim 2, further comprising an impedance transition circuit coupled to the electric input and to the impedance transition section, wherein an input of the impedance transition circuit is associated with the input impedance, wherein an output of the impedance transition circuit is associated with the first impedance, and wherein the first impedance is less than the input impedance.

5. The electro-optic modulator device of claim 1, further comprising a termination circuit coupled to an end of the signal electrode.

6. The electro-optic modulator device of claim 1, further comprising a light input configured to facilitate transfer of the light from an input optic fiber to the optical waveguides of the optical layer.

7. The electro-optic modulator device of claim 1, further comprising:
a modulated light output configured to facilitate transfer of modulated light based on the signal from the optical layer; and one or more output optic fibers coupled to the modulated light output.

8. The electro-optic modulator device of claim 1, further comprising a quartz substrate coupled to the optical layer.

9. The electro-optic modulator device of claim 1, wherein a thickness of the optical layer is between 5 microns and 10 microns.

10. The electro-optic modulator device of claim 1, wherein the signal electrode is coupled to a portion of the optical layer between the optical waveguides, wherein gaps are located between the signal electrode and the ground electrodes, and wherein the optical waveguides are located in the optical layer between the gaps.

11. The electro-optic modulator device of claim 10, wherein widths of the gaps gradually decrease in the impedance transition section.

12. An electro-optic modulator device comprising:
an electric input configured to receive a signal, wherein the electric input is associated with an input impedance;
an optical layer, wherein the optical layer includes optical waveguides; and
an electrode structure coupled to the optical layer, wherein the electrode structure comprises a signal electrode disposed between ground electrodes, wherein the signal electrode is configured to carry the signal, wherein the electrode structure is configured to generate an electric field based on the signal, wherein the electric field is configured to modulate light passing through the optical waveguides to produce modulated light based on the signal, wherein the electrode structure comprises an impedance transition section, wherein an input of the impedance transition section is associated with the input impedance, wherein an output of the impedance transition section is associated with a second impedance that is less than the input impedance, wherein the electrode structure includes a constant impedance section associated with the second impedance, and wherein a length of the impedance transition section is smaller than a length of the constant impedance section.

13. The electro-optic modulator device of claim 12, further comprising an impedance transition circuit coupled to the electric input, wherein an input of the impedance transition circuit is associated with the input impedance, and wherein an output of the impedance transition circuit is associated with a first impedance that is less than the input impedance.

14. The electro-optic modulator device of claim 13, wherein a number of the optical waveguides is two.

15. The electro-optic modulator device of claim 14, wherein a width of the signal electrode in the impedance transition section is a constant width, and wherein the constant width is a value between 80 microns and 300 microns.

16. The electro-optic modulator device of claim 12, further comprising a termination circuit coupled to an end of the signal electrode.

17. The electro-optic modulator device of claim 12, further comprising a light input configured to facilitate transition of the light from an input optic fiber to the optical waveguides of the optical layer.

18. The electro-optic modulator device of claim 12, further comprising a modulated light output configured to facilitate transition of the modulated light based on the signal from the optical layer to one or more output optic fibers.

19. The electro-optic modulator device of claim 12, further comprising a quartz substrate coupled to the optical layer.

20. The electro-optic modulator device of claim 12, wherein a width of the signal electrode in the constant impedance section is a constant width, and wherein the constant width is a value between 80 microns and 300 microns.

21. The electro-optic modulator device of claim 12, wherein the optical layer comprises one of lithium niobate, barium titanate, potassium titanyl phosphate, potassium niobate, a lead lanthanum zirconium titanate type material, a barium strontium titanate type material, or an organic crystal.

22. An electro-optic modulator device comprising:
a quartz substrate;
a lithium niobate layer coupled to the quartz substrate, wherein the lithium niobate layer comprises a plurality of optical waveguides, and wherein a crystallographic axis of the quartz substrate is aligned with a crystallographic axis of the lithium niobate layer; and
an electrode structure coupled to the lithium niobate layer, wherein the electrode structure comprises a signal electrode configured to carry a signal and ground electrodes, wherein the electrode structure is positioned in working relation to optical waveguides in a first section of the lithium niobate layer, wherein the electrode structure is configured to generate an electric field based on the signal between the signal electrode and the ground electrodes, wherein the electric field is configured to modulate light in the plurality of optical waveguides to produce modulated light based on the signal, wherein the electrode structure comprises an impedance transition section configured to adjust an impedance associated with the electrode structure, and wherein the electrode structure includes a constant impedance section coupled to the impedance transition section.

23. The electro-optic modulator device of claim 22, wherein an impedance associated with an input of the impedance transition section is a first impedance, and wherein an output of the impedance transition section and the constant impedance section are associated with a second impedance that is less than the first impedance, and wherein a length of the impedance transition section is smaller than a length of the constant impedance section.

24. The electro-optic modulator device of claim 22, wherein a thickness of the lithium niobate layer is equal to or greater than a diameter of a core of an input optic fiber that provides the light to the lithium niobate layer, and further comprising:
a modulated light output configured to facilitate transfer of modulated light based on the signal from the lithium niobate layer; and
one or more output optic fibers coupled to the modulated light output.

25. The electro-optic modulator device of claim 22, wherein an impedance associated with an input of the impedance transition section is a first impedance, and wherein an output of the impedance transition section and the constant impedance section are associated with a second impedance that is less than the first impedance.

26. An electro-optic modulator device comprising:
an electric input configured to receive a signal, wherein the electric input is associated with an input impedance;
an impedance transition circuit coupled to the electric input, wherein an input of the impedance transition circuit is associated with the input impedance and an output of the impedance transition circuit is associated with a first impedance less than the input impedance;

a light input configured to receive light;

an electro-optic modulator, wherein the electro-optic modulator comprises an optical layer coupled to the light input and configured to direct the light into optical waveguides in the optical layer and an electrode structure coupled to the impedance transition circuit, wherein the electrode structure is configured to generate an electrical field based on the signal that modulates the light in the optical waveguides to produce modulated light;

a modulated light output configured to direct the modulated light from the optical layer to one or more output optic fibers; and a phase shifter coupled to a second electro-optic modulator device, wherein the phase shifter is configured to receive the light, wherein the second electro-optic modulator device includes a second electric input configured to receive a second signal, a second light input configured to receive output light from the phase shifter, and a second electro-optic modulator, and wherein the modulated light from the optical layer is configured to be combined with second modulated light from the second electro-optic modulator and directed to the one or more output optic fibers.

27. The electro-optic modulator device of claim 26, wherein the electrode structure includes a signal electrode disposed between ground electrodes.

28. The electro-optic modulator device of claim 26, wherein the electrode structure includes an impedance transition section and a constant impedance section, wherein an input of the impedance transition section is associated with the first impedance, and wherein an output of the impedance transition section and the constant impedance section are associated with a second impedance less than the first impedance.

29. The electro-optic modulator device of claim 28, wherein gaps between a signal electrode and ground electrodes of the electrode structure at the input of the impedance transition section have a first width, wherein the gaps at the output of the impedance transition section have a second width smaller than the first width, and wherein the gaps gradually reduce from the first width to the second width along a length of the impedance transition section.

30. The electro-optic modulator device of claim 28, wherein a length of the impedance transition section is smaller than a length of the constant impedance section.

31. The electro-optic modulator device of claim 26, further comprising a quartz substrate coupled to the optical layer.

32. A method comprising:

receiving light at a light input of an electro-optic modulator device;

directing the light via the light input into optical waveguides in an optical layer of an electro-optic modulator of the electro-optic modulator device;

receiving a signal at an electric input of the electro-optic modulator device, wherein the electric input is associated with an input impedance;

providing the signal to an electrode structure of the electro-optic modulator, wherein the electrode structure generates an electrical field based on the signal, wherein the electric field modulates light in the optical waveguides to produce modulated light based on the signal, wherein the electrode structure includes an impedance transition section having a first length, and wherein the electrode structure includes a constant impedance section that is associated with a second impedance less than the input impedance and that has a second length that is smaller than the first length;

adjusting, using the impedance transition section, the input impedance to reduce the input impedance to the second impedance; and providing the modulated light based on the signal from the optical layer to one or more output optic fibers.

33. The method of claim 32, further comprising providing the signal from the electric input to an impedance transition circuit, wherein an input of the impedance transition circuit is associated with the input impedance, and wherein an output of the impedance transition circuit is associated with a first impedance less than the input impedance.

34. The method of claim 33, wherein the optical layer is coupled to a quartz substrate, and wherein the first impedance is the second impedance.

35. The method of claim 33, further comprising providing the signal from the impedance transition circuit to a signal electrode of the impedance transition section of the electrode structure, wherein an input of the impedance transition section is associated with the first impedance, and wherein an output of the impedance transition section is associated with the second impedance.

36. The method of claim 33, further comprising providing the signal from an end of a signal electrode of the electrode structure to a termination circuit.

\*  \*  \*  \*  \*